United States Patent [19]

Robertson

[11] 4,028,128

[45] June 7, 1977

[54] PIGMENT DISPERSIONS

[75] Inventor: George Heddle Robertson, Paisley, Scotland

[73] Assignee: Ciba-Geigy Corporation, Ardsley, N.Y.

[22] Filed: Mar. 9, 1976

[21] Appl. No.: 665,192

[30] Foreign Application Priority Data

Mar. 12, 1975  United Kingdom ............ 10239/75

[52] U.S. Cl. ............................. 106/308 Q; 106/20
[51] Int. Cl.$^2$ ......................................... C09C 3/08
[58] Field of Search ....................... 106/308 Q, 309

[56] References Cited

UNITED STATES PATENTS 2,805,961  9/1957  Puddington et al. .......... 106/308 Q

FOREIGN PATENTS OR APPLICATIONS 1,202,636  8/1970  United Kingdom ........... 106/308 Q Primary Examiner—Winston A. Douglas
Assistant Examiner—J. V. Howard
Attorney, Agent, or Firm—Vincent J. Cavalieri

[57] ABSTRACT

A pigment dispersion comprising
i. a pigment
ii. a carboxy ester having an acid value in the range of from 15 to 140 mg KOH/g and having been formed by the reaction of:
  a. a compound of formula ROH, or a mixture of such compounds, wherein R is an alkyl or alkenyl residue, each having from 12 to 30 carbon atoms, or a hydroxyterminated carboxylic acid ester having from 12 to 100 carbon atoms, with
  b. trimellitic acid or a derivative thereof and optionally
  c. a diol of the formula HO-Y-OH wherein Y is a straight or branched alkylene residue having from 2 to 12 carbon atoms, optionally containing in addition, an alkyl or alkylene side chain of 2 to 22 carbon atoms, attached by an ether or ester linkage, or Y is a hydrocarbon residue having from 4 to 12 carbon atoms containing ether or thioether linkages, and optionally
iii. an organic liquid is useful for paints, lacquers and inks, especially gravure ink systems having excellent tinctorial strength and flow properties.

11 Claims, No Drawings

PIGMENT DISPERSIONS

The present invention relates to pigment dispersions.

By virtue of their high strength, brilliant shades and good fastness properties, pigments are of great commercial significance in a wide range of applications.

However, while their general fastness properties are excellent, pigments stored as dispersions in non-aqueous solvents for use in paint and the ink systems suffer from a particular defect. This defect is the tendency of the pigment particles to flocculate. This flocculation may occur during the dispersion process, during storage or during evaporation of the solvent from the paint or ink coating. The effect is to produce dispersions of increased viscosity which are not pourable or pumpable, especially under conditions of low shear, and a loss of gloss and tinctorial strength in the final coating.

We have now found a class of pigment compositions providing pigment dispersions which overcome these defects. These dispersions are more fluid than conventional dispersions and therefore allow higher pigment loading during dispersion and more efficient discharge and easier handling from the dispersion vessel. Moreover, on storage the new dispersions retain their fluidity and colouristic properties.

According to the present invention, there is provided a composition comprising
i. a pigment,
ii. a carboxy ester having an acid value in the range of from 15 to 140 mg KOH/g. and having been formed by the reaction of
a. a compound of formula ROH, or a mixture of such compounds, wherein R is an alkyl or alkenyl residue each having 12 – 30 carbon atoms, or a hydroxy-terminated carboxylic acid ester having from 12 to 100 carbon atoms, with (b) trimellitic acid or a derivative thereof, and optionally (c) a diol of formula HO—Y—OH wherein —Y— is a straight or branched alkylene residue having from 2 – 12 carbon atoms, optionally having in addition an alkyl or alkylene side chain of 2 – 22 carbon atoms attached by an ether or ester linkage or hydrocarbon residue of 4 – 12 carbon atoms containing ether or thioether linkages, and optionally
iii. an organic liquid.

Pigments which are suitable components of the compositions of the present invention include organic pigments, for instance azo pigments, azo metal salts and azomethine pigments, metallised or metal-free phthalocyanines, polycyclic pigments such as quinacridones, dioxazines, vat dyestuffs, anthraquinones, perylene, perinone, thioindigo and isoindolinones, and salts of basic pigments precipitated with the heteropoly acids of phosphorus, tungsten and molybdenum. Inorganic pigments such as titanium dioxide and red and yellow oxides may also be used, as well as carbon black.

The pigment component may be in its un-modified form, that is in the form obtained at the completion of its direct chemical synthesis, and not containing any additives or co-reactants. Preferably, however, the pigment component is such that it has been modified by incorporation of a pigment derivative such as that described for example in British Patent Specification No. 1,263,684, 1,356,253, 1,356,254, and in our co-pending British Patent Application (No. 6041/75).

The organic liquid component may be any inert organic liquid or mixture thereof which is stable to the condition under which pigment dispersions are employed in application. The organic liquid is preferably such that the carboxy ester dispersion stabilisers are substantially completely soluble in the organic liquid. Of particular interest are water-insoluble organic liquids especially hydrocarbon liquids which are optionally halogenated, such as n-hexane, n-heptane, n-octane, white spirit, carbon tetrachloride, perchloroethylene, benzene, toluene, o-, m- and p-xylenes, and chlorobenzene or mixtures of these solvents with alcohols such as ethanol, propanol, butanol or ketones such as acetone and methyl ethyl ketone. Other organic liquids which are of interest are those form the base of paint and ink systems, for example long- and short oil alkyd resins and natural oils, especially linseed oil. The organic liquid may be used in conjunction with binders such as urea- or melamine- formaldehyde resins or zinc/calcium resinates known for use in ink and paint systems.

Component (a) of the reaction mixture used to produce the carboxy ester dispersion stabiliser may be a simple alkyl or alkenyl alcohol preferably having 12 to 22 carbon atoms. Examples of such simple alcohols include lauryl alcohol, tridecanol, tetradecanol, hexadecanol (cetyl alcohol), n-octadecyl alcohol, n-eicosyl alcohol (arachidic alcohol), n-docosyl alcohol (behenyl alcohol) and oleyl alcohol.

Alternatively, component (a) may be an hydroxy-terminated ester, for instance an ester formed according to one of the following reaction schemes:- i) (HO—X—COOH)$_n$ + ROH 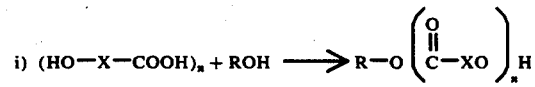

wherein R has its previous significance, n is 1, 2, 3 or 4 and X is a divalent alkylene or alkenylene residue having from 8 to 20 carbon atoms and having at least 4 carbon atoms between the hydroxy and carboxylic acid groups;

ii) ROH + n HO—Y—OH + nHO$_2$C—X$_1$—CO$_2$H

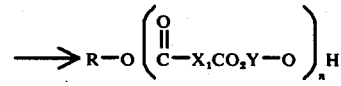

wherein R, Y and n have their previous significance and X$_1$ has the same significance as Y;

iii) R—COOH + HO—Y—OH 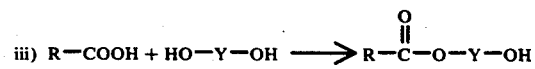

wherein R and Y have their previous significance iv) R—COOH + n + 1 HO—Y—OH + n HO$_2$C—X$_1$—CO$_2$H

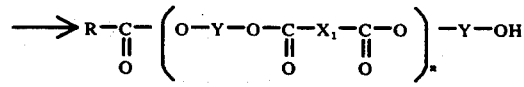

wherein R, Y, X$_1$ and n have their previous significance.

The products of each of these reaction schemes have a free hydroxy group capable of reacting with a trimellitic acid derivative to produce a carboxy ester.

With respect to reaction scheme 1), the reactant ROH is desirably a simple alkyl or alkenyl alcohol, examples of which have been given hereinbefore and reactant HO-X-COOH is preferably a 9-, 10- or, especially, 12-hydroxy stearic acid.

In reaction scheme ii), the reactant ROH is preferably a simple alcohol, as before. Preferred examples of diols HO—Y—OH are those containing an alkylene residue of at least 4 carbon atoms such as butane-1,4-diol, hexane-1,6-diol, nonane-1,9-diol, dodecane-1,12-diol, 2-ethylhexane-1,3-diol, butane-1,3-diol and neopentyl glycol.

Preferred dicarboxylic acids $HO_2C-X_1CO_2H$ are α-ω-dicarboxylic acids having 4 to 12 carbon atoms in the alkylene residue, for example, adipic acid, suberic acid and sebacic acid.

With regard to reaction scheme iii), preferred reactants RCOOH contain 12 – 22 carbon atoms and include lauric acid, tetradecanoic acid, hexadecanoic acid (palmitic acid), stearic acid, eicosanoic acid (arachidic acid) docosanoic acid (behenic acid) and oleic acid.

In relation to reaction scheme iv), the preferred reactants are those described above in relation to the other reaction schemes.

Preferred reaction components b) are trimellitic acid, trimellitic anhydride, trimellitic mono-acid chloride, and monoalkyl ($C_1$–$C_{12}$) esters of trimellitic acid.

Reaction component (c) HO—Y—OH includes the α-ω-polymethylene primary glycols of the formula $HO(CH_2)_nOH$ where $n$ is 2–12 e.g. ethylene glycol, propane 1,3-diol, butane 1,4-diol, hexane 1,6-diol, decane 1,10-diol, dodecane 1,12-diol; branched primary glycols such as neopentyl glycol; secondary and tertiary glycols such as 1,3-butylene glycol, 2-methyl pentane 2,4-diol, and 2-ethyl hexane 1,3-diol; glycols containing ester or ether substituents and chains such as mono esters of glycerol or trimethylol ethane e.g. glyceryl mono-oleate, glyceryl mono-palmitate or mono ethers of glycerol e.g. glyceryl mono-stearyl ether; glycols containing ether or thio ether linkages such as diethylene glycol dibutylene glycol and thiodibutylene glycol.

In the preparation of the carboxy esters, the relative proportions of the individual reactants are chosen so that the carboxy ester produced from reaction components a), b) and c) as hereinbefore defined contains an excess of free carboxylic acid groups, whereby the acid value of the carboxy ester is within the range of from 15 to 140 mg KOH/g., more preferably within the range of from 40 to 100 mg KOH/g. In terms of mole ratios the carboxy ester products are defined by the limits $[a]_2[b]_{1-2}[c]_{0-1}$ with the proviso that $[a] - [c] = 1$. Thus the relative proportions of the individual reactants are so selected that the carboxy ester product contains on average not more than two free carboxylic acid groups and not less than two R moieties.

The carboxy esters may be prepared by a simultaneous or step-wise reaction sequence. For instance, all the reactants may be reacted together in a one-pot process or, e.g. where a diol HO—Y—OH is used, the compound ROH and the trimellitic derivative may be first reacted together and the reaction product so obtained may then be reacted with the diol. Moreover, if the reactant ROH contains an ester moiety, this ester-alcohol compound may be prepared separately prior to reaction with the trimellitic derivative.

Whether the ester production is effected in one or more stages, any reaction step involving an esterification process is preferably effected in the presence of an esterification catalyst, such as tetrabutyl titanate. Desirably, the esterification reaction is also carried out at an elevated temperature and in the presence of an inert organic solvent, such as xylene, which is capable of forming an azeotropic mixture with water and/or alkanol derived from lower alkyl esters of the trimellitic acid derivative thus providing a convenient way of removing, by distillation, water and/or alkanol formed during the esterification reaction. The ester so produced may be isolated in conventional manner, for instance by distillation of solvents.

It is convenient to choose an organic solvent which is to be utilised in the subsequent pigment dispersion and surface coating (e.g. paint formulation) e.g. preparation of the ester in white spirit for subsequent use with dispersions for long oil alkyl decorative paints.

Pigment compositions according to the present invention may be prepared by any convenient method although the following techniques are of especial interest in providing compositions comprising pigment, carboxy ester and organic liquid or compositions comprising pigment and carboxy ester, for subsequent dispersion in the organic liquid:

a. milling (ball, sand or bead) a mixture of pigment, organic liquid and carboxy ester stabiliser for the period required to produce a fine dispersion.

b. adding the carboxy ester during the treatment of the pigment with a solvent e.g. isopropanol, isolating the pigment and carboxy ester and then dispersing the pigment/carboxy ester in the organic liquid e.g. an aliphatic hydrocarbon.

c. flushing the pigment from aqueous press-cake into the organic liquid and then adding the carboxy ester stabiliser to this pigment and organic liquid.

d. incorporating the carboxy ester during salt-milling into pigmentary form of the pigment, e.g. a crude phthalocyanine pigment, and subsequently dispersing the milled product into the organic liquid.

e. preparing the carboxy ester in situ from its precursors during treatment of the pigment in any of steps a), b), c) or d).

f. adding an aqueous solution or dispersion of the carboxy ester to an aqueous slurry of the pigment, precipitating the ester and removing the pigment and ester by filtration, washing and drying and then dispersing the composition in the organic liquid. The aqueous solution or dispersion of the ester may be obtained by the use of a suitable nonionic surfactant or by formation of the ammonia or alkali metal salts either with or without the aid of a nonionic surfactant.

If desired, the pigment dispersions of the present invention can contain known auxiliaries for pigment dispersions for instance zinc- and zinc/calcium resinates.

The amount of the carboxy ester in the compositions according to the invention is preferably within the range of from 2 to 200%, especially from 5 – 60% by weight, based on the total weight of the pigment. The amount of solvent in the solvent containing composition is desirably within the range of from 10% to 90%, especially from 20% to 60% by weight, based on the total weight of the dispersion.

The pigment compositions of the present invention have excellent strength and flow properties when used in surface-coating applications, such as paints, lacquers and inks, particularly in gravure ink systems. In addition to their excellent performances in applicational media, the solvent containing compositions of the invention are also advantageous in that they are convenient to handle and are easily metered since they are in the form of a highly concentrated pumpable liquid.

The following Examples further illustrate the present invention. Parts by weight shown therein bear the same relation to parts by volume as do kilograms to liters.

PREPARATION OF CARBOXY ESTERS

A. A mixture of 240 parts by weight of 12-hydroxystearic acid, 214 parts by weight of oleyl alcohol, 120 parts by volume of xylene and 0.1 part by weight of tetrabutyl titanate was heated to 180° C. under nitrogen, and water produced during the reaction was removed by distillation as it was formed. After 12 hours, the product obtained was examined and found to have an acid value of 0 mg KOH/g. To this reaction mixture, there was then added 47.2 parts by weight of hexane diol, which was allowed to melt at 180° C. and 164.8 parts by weight of trimellitic acid monomethyl ester and 0.4 part by weight of tetrabutyl titanate were added. The reaction temperature was maintained at 180° C. for a further 8 hours, the water and methanol formed during the reaction being continuously removed by distillation as it was formed. The xylene solvent was then removed by distillation under reduced pressure to leave a light-brown viscous oil having an acid value of 59 mg KOH/g. (Ester A).

B. A mixture of 268 parts by weight of oleyl alcohol, 59 parts by weight of hexane-1,6-diol, 192 parts by weight of trimellitic anhydride, 0.3 part by weight of tetrabutyl titanate and 120 parts by volume of xylene was heated in a nitrogen atmosphere for 12 hours at 180° C. to 190° C. Water formed during the reaction was continuously removed by distillation.

At the end of this period, the xylene solvent was removed by distillation to leave a brown viscous resin having an acid value of 95 mg KOH/g. (Ester B).

C. The procedure described under B) was repeated except that the hexane-1,6-diol reactant was replaced by 73 parts by weight of 2-ethyl-hexane-1,3-diol. The viscous resin obtained had an acid value of 96 mg KOH/g (Ester C).

D. A mixture of 53.6 parts by weight of oleyl alcohol, 41.2 parts by weight of trimellitic acid monomethyl ester, 9.0 parts by weight of butane-1,4-diol, 30 parts by volume of xylene and 0.3 part by weight of tetrabutyl titanate was heated to 180° C. in an atmosphere of nitrogen for 12 hours.

At the end of this time, the xylene solvent was removed by distillation under reduced pressure to leave a brown viscous resin having an acid value of 90 mg KOH/g (Ester D).

E. The procedure described under D) was repeated except that the butane-1,4-diol was replaced by 10.4 parts by weight of neopentyl glycol. The resin so obtained had an acid value of 60 mg KOH/g (Ester E).

E. The procedure described under D) was repeated except the butane-1,4-diol was replaced by 6.9 parts by weight of glyceryl monostearyl ether. The product so obtained had an acid value of 51 mg KOH/g. (Ester F).

G. The procedure described under D) was repeated except that the butane-1,4-diol was replaced by 11.8 parts by weight of hexane-1,6-diol. The product so obtained has an acid value of 60 mg KOH/g. (Ester G).

H. The procedure described under G) was repeated except that the oleyl alcohol was replaced by 37.2 parts by weight of lauryl alcohol. The pale yellow oil thus obtained had an acid value of 82 mg KOH/g. (Ester H).

I. A mixture of 28.2 parts by weight of oleic acid, 27.7 parts by weight of hexane-1,6-diol and 15 parts by volume of xylene was heated in a nitrogen atmosphere at 180° to 190° C. for 6 hours. Water produced during the reaction was removed continuously by distillation. The product so obtained had nil acid value.

To this mixture, there were added 20.6 parts by weight of trimellitic acid monomethyl ester and 0.2 part by weight of tetrabutyl titanate and the reaction mixture was heated at 180° C. for a further 8 hours, with continuous removal of water and methanol formed during the reaction.

The xylene solvent was then removed by distillation under reduced pressure to leave a viscous oil having an acid value of 59 mg KOH/g. (Ester I).

J. The procedure described under B) was repeated except that the oleyl alcohol used therein was increased from 268 parts to 402 parts by weight. The product so obtained had an acid value of 73 mg KOH/g. (Ester J).

K. A mixture of 38.4 parts by weight of trimellitic anhydride, 107.6 parts by weight of oleyl alcohol and 40 parts by weight of xylene was heated to 180° C. under a nitrogen atmosphere for 16 hours.

Water formed during the reaction was continuously removed by distillation.

After removal of the xylene solvent by distillation under reduced pressure, there was left a product having an acid value of 70 mg KOH/g.

L. A mixture of 53.6 parts by weight of oleyl alcohol, 41.2 parts by weight of trimellitic acid monomethyl ester and 30 parts by volume of xylene was heated to 180° C. and the water and methanol formed during the reaction were continuously removed by distillation. After 8 hours, 11.8 parts by weight of hexane-1,6-diol and 0.2 part of tetrabutyl titanate were added and the reaction mixture was heated at 180° C. for a further 8 hours, whilst continuously removing water and methanol as formed during the reaction.

After removal of the xylene solvent by distillation under reduced pressure, a brown viscous oil was left having an acid value of 70 mg KOH/g. (Ester L).

M. A mixture of 120 parts by weight of 12-hydroxystearic acid, 26.8 parts by weight of oleyl alcohol, 20.6 parts by weight of trimellitic acid monomethyl ester, 5.9 parts by weight of hexane-1,6-diol, 80 parts by volume of xylene and 0.3 part by weight of tetrabutyltitanate was heated at 180° to 190° C. in an atmosphere of nitrogen for 12 hours. Water and methanol were continuously removed, as formed, from the reaction mixture by distillation under reduced pressure, there was left a product having an acid value of 43 mg KOH/g. (Ester M).

N. The procedure of Example B was followed except that the trimellitic anhydride was replaced by a mixture of monomethyl ester of trimellitic acid (103 parts) and trimellitic anhydride (96 parts). A product of acid value 70 mg KOH/gm was obtained. (Ester N).

O. A mixture of 21.05 parts by weight of 4-acid chloride of trimellitic anhydride, 26.8 parts by weight of oleyl alcohol, 5.9 parts by weight of hexane 1,6 diol and 180 parts by volume of methyl ethyl ketone was heated at 80° C for 6 hours. The hydrogen chloride produced was constantly drawn off through a trap of sodium hydroxide. When no more hydrogen chloride was evolved 50 parts by volume of dimethyl formamide was added and the mixture heated at 100° C for a further 6 hours.

The methyl ethyl ketone and dimethyl formamide were then removed by distillation under reduced pressure. The resultant product was brown in colour having an acid value of 112.5 mg KOH/g.

P. A mixture of 18.71 parts by weight of 12-hydroxystearic acid, 16.71 parts by weight of oleyl alcohol, 0.0075 parts by weight of tetra-n-butyl titanate and 12.5 parts by volume of xylene was heated to 180° C under an atmosphere of nitrogen and water produced during the reaction was removed by distillation as it was formed. After 12 hours, the product obtained was examined and found to have a nil acid value. The xylene was then removed by distillation under reduced pressure. To this product 10.525 parts by weight of 4-acid chloride of trimellitic anhydride, 2.95 parts by weight of hexane 1,6 diol and 150 parts by volume of methyl ethyl ketone were added and the resulting solution heated at 80° C for 6 hours. The hydrogen chloride produced was constantly drawn off through a trap of sodium hydroxide. When no more hydrogen chloride was evolved 50 parts by volume of dimethyl formamide was added and the mixture heated at 100° C for a further 6 hours.

The methyl ethyl ketone and dimethyl formamide were removed by distillation under reduced pressure. The resultant product was brown in colour having an acid value of 70.5 mg KOH/G.

Q. The procedure described under D was repeated except that the butane-1,4-diol was replaced 10.6 parts of diethylene glycol. The resultant resin had an acid value of 90 mg KOH/g (Ester Q).

R. The procedure described under D was repeated except that the butane-1,4-diol was replaced by 17.8 parts of thio-diglycol ($HO(CH_2)_4S-(CH_2)_4OH$). The resultant resin had an acid value of 80 mg KOH/g (Ester R).

S. A mixture of 1608 parts of oleyl alcohol, 1158 parts trimellitic anhydride, 312 parts neopentyl glycol 3 parts tetra-butyl titanate and 500 parts white spirit were heated at 180°–200° C under a nitrogen atmosphere for 12 hours. The water formed was continuously removed. The resultant product was an 87%$^{w}$/w solution of a resin of acid value 85 mg KOH/gm. (Ester S).

EXAMPLE 1

A mixture of 30 parts by weight of C.I. Pigment Yellow 1, 10 parts by weight of Ester A and 60 parts by weight of white spirit (an aliphatic hydrocarbon solvent having a distillation range of 90°–105° C.) was ball-milled for 16 hours.

The level of discharge from the ball-mill was 90% indicating that the dispersion obtained had good rheological properties. When incorporated into a long oil alkyd paint, films of excellent gloss and strength were obtained.

Similar results were obtained when Ester A was replaced by one of Esters E, F, G, K, L or M.

EXAMPLE 2 a. A diazo solution was prepared from 30.4 parts by weight of 3-nitro-4-amino toluene in 200 parts by weight of water and 49.0 parts by weight of 10 N hydrochloric acid by the addition of 14.0 parts by weight of sodium nitrite in 50 parts by weight of water at a temperature between $-2°$ and $0°$ C over about 4 hours. The resulting diazo solution was treated with activated carbon, filtered and made up to 500 parts by weight with water at 0° C.

A coupling component solution was prepared from 34.6 parts by weight of aceto-acetanilide and 1.7 parts by weight of 4,7-dihydro-5-methyl-7-oxo-1H-2,3-benzo-1,4-diazepine dissolved in 450 parts by weight of water containing 8.2 parts by weight of sodium hydroxide.

The two solutions were coupled together by running them simultaneously into 500 parts by weight of water containing 7.0 parts by weight of sodium acetate trihydrate and 3.0 parts by weight of glacial acetic acid. The rates of addition were adjusted so that the pH was maintained between 4.5 and 5.0 and so that no excess diazonium component could be detected. When the coupling was complete, the slurry was heated to 95° C., held at this temperature for 1 hour and then filtered, washed and dried at 50° C., to give a modified C.I. Pigment Yellow 1.

b. A mixture of 36 parts by weight of the pigment produced according to Example 2 a), 10 parts by weight of Ester A and 54 parts by weight of white spirit was ball-milled for 16 hours.

The product had a ball-mill discharge level of 92%.

EXAMPLE 3 a. A pigment was produced according to the procedure described in Example 2a) except that the amount of 4,7-dihydro-5-methyl-7-oxo-1H-2,3-benzo-1,4-diazepine was reduced to 1.3 parts by weight.

b. A mixture of 35.5 parts by weight of the modified C.I. Pigment Yellow 1 produced according to Example 3a), 15 parts by weight of Ester B and 49.5 parts by weight of white spirit was ball-milled for 16 hours.

The product had a ball-mill discharge level of 92%.

EXAMPLE 4

The procedure described in Example 3 was repeated except that Ester B was replaced by Ester C.

The product so obtained had a ball-mill discharge level of 90%.

EXAMPLE 5

A mixture of 31 parts by weight of the modified C.I. Pigment Yellow 1 produced according to Example 2a), 10 parts by weight of Ester D and 59 parts by weight of white spirit was ball-milled for 16 hours.

The product so obtained had a ball-mill discharge level of 90%

EXAMPLE 6

The procedure described in Example 5 was repeated except that Ester D was replaced by Ester I.

The product so obtained had a ball-mill discharge level of 87%.

EXAMPLE 7

The procedure described in Example 5 was repeated except that Ester D was replaced by Ester J.

The product so obtained had a ball-mill discharge level of 90%.

EXAMPLE 8 a. A modified C.I. Pigment Yellow 74 was produced by repeating the procedure described in Example 2a) but replacing the 3-nitro-4-amino-toluene by an equivalent amount of 2-methoxy-4-nitroaniline.

b. A mixture of 31 parts by weight of the modified C.I. Pigment Yellow 74 produced in Example 8a), 10 parts by weight of Ester A and 59 parts by weight of xylene was ball-milled for 16 hours.

The product so obtained had a ball-mill discharge level of 90%. This product gave good colouristic properties when let down into a publication gravure ink formulation.

EXAMPLE 9

The procedure described in Example 8 was repeated except that Ester A was replaced by Ester H and the xylene solvent was substituted by white spirit.

The product so obtained had a ball-mill discharge level of 85%.

EXAMPLE 10 a. A diazo solution was prepared from 1.98 parts by weight of o-nitroaniline -p-sulphonic acid and run into a slurry of 2.11 parts by weight of o-chloroacetanilide at a pH in the range 4.5 to 4.8. Following the procedure of B.P. 1,356,254 this dyestuff was added to a 5% aqueous slurry of C.I. Pigment Yellow 3 at 80° C. After this addition
5 parts by weight of Rosin Amine D dissolved in 1.5 parts by weight of acetic acid were added to the slurry which was maintained at 80° C, for 30 minutes, filtered, washed free of soluble salts and dried at 50° C., to provide a modified C.I. Pigment Yellow 3.

b. A mixture of 35 parts by weight of the pigment from Example 10a), 10 parts by weight of Ester C and 55 parts by weight of white spirit was ball-milled for 16 hours.

The product so obtained had a ball-mill discharge level of 93%.

EXAMPLE 11

20 parts of β-CuPc prepared according to Example 1 B.P. 1,263,684 and 10 parts of carboxyester B and 70 parts of white spirit were ball-milled for 16 hours. The product so obtained had a ball-mill discharge of 88%.

EXAMPLE 12

A mixture of 35 parts of C.I. Pigment Yellow 1 and 0.25 parts of a pigment derivative formed by coupling a diazotated 3-aminopyridine with acetoacetanilide and 15 parts of ester P were ball-milled in 49.75 parts white spirit for 16 hours.

The product so obtained had a ball mill discharge rate of 93% and when incorporated into a long oil alkyl paint gave excellent gloss and colour strength.

After storage for 4 weeks at 20° C., the dispersion was still fluid and when incorporated into the long oil alkyd reproduced the strength and gloss of the initial sample.

EXAMPLE 13

20 parts of a pigment prepared by coupling tetrazotised 3,3′-dichlorobenzidine with a 90 : 10 mole ratio mixture of acetoacetanilide and diazepine as used in Example 2, 10 parts of polyester B and 70 parts of a hydrocarbon solvent (60% aliphatic/40% toluene) were ball-milled for 16 hours.

The product so obtained had a ball-mill discharge rate of 85% and gave good gloss and strength when incorporated into a publication gravure ink.

EXAMPLE 14

14 parts of a resinated version of CI Pigment Red 57 were dispersed by ball-milling for 16 hours with 19.6 parts of ester B and 36.4 parts of white spirit. The resultant dispersion gave a 90% discharge in 20 seconds. A comparative dispersion obtained by replacing ester B by a long oil alkyd gave, under identical conditions, a 25% discharge. The fluid dispersion based on ester B was easily handled and when incorporated into a publication gravure ink gave films of excellent gloss and strength.

EXAMPLE 15

30 parts of C.I. Pigment Red 88, 10 parts of ester B and 60 parts of xylene were ball-milled for 20 hours. The resultant fluid dispersion gave an excellent gloss and strength when incorporated into a long oil alkyd paint.

EXAMPLE 16

35 parts of the pigment in Example 2a) 11.5 parts of the 87% by weight, solution of Ester S in white spirit and further 53.5 parts of white spirit were ball-milled for 20 hours. The resultant dispersion gave a discharge level of 92%.

EXAMPLE 17

A mixture of 35 parts of C.I. Pigment Yellow 1 and 0.5 parts of a basic pigment derivative formed by diazotising and coupling 3-nitro-4 amino toluene onto acetoacetylated 2-amino pyridine and 10 parts of carboxy ester Q and 54.5 parts of white spirit were ball-milled for 16 hours.

The product so obtained had a ball-mill discharge of 75% and gave excellent gloss and colour strength when incorporated into a long oil alkyd paint.

EXAMPLE 18

The procedure of Example 15 was repeated except that ester Q was replaced by ester R. A ball-mill discharge of 87% was obtained. Colouristic performance was similar to Example 17.

EXAMPLE 19

10 parts of carboxy ester B was stirred in 400 parts of water and 5 mls. of aqueous ammonia and 0.5 parts "Lissapol NX" were added. The temperature was raised to 80° C and stirring continued for 30 minutes. The resultant dispersion was added to a slurry of 50 parts of C.I. Pigment Yellow 1 and 1 part of the basic pigment derivative of Example 17 in 800 parts of water.

The mixture was heated to 85° C, held for 30 minutes, the pH adjusted to 4.5 and the material filtered, washed free of inorganic salts and dried. The resultant product was dispersed by ball-milling into 165 parts of white spirit to give a fluid millbase with a discharge of 93%.

EXAMPLES 20–22

The following Example compares the fluidity of pigments dispersed in a conventional long oil alkyd ("Beckosol P. 470") with carboxy ester E of this invention. In all cases the ester B gives a more fluid dispersion.

| Example | Pigment Type | %w/w | Solvent White Spirit | xylene | Resin % | Discharge (%) Time (secs.) |
|---|---|---|---|---|---|---|
| 20 | TiO$_2$—RCR-2 ex Tioxide Inter. | 50 | — | 30 | Ester B-20 | 86/10 |
| Control | " | 50 | — | 30 | Alkyd-20 | 80/15 |
| 21 | Carbon Black Philblack | 25 | 33 | 33 | Ester B 9. | 88/30 |
| Control | " | 25 | 33 | 33 | Alkyd 9 | 22/30 |
| 22 | C.I.Pig. Red 166 | 33 | 58 | — | Ester B 9 | 75/30 |
| Control | " | 33 | 58 | — | Alkyd-9 | 15/30 |

EXAMPLE 23

20 parts of the modified C.I. Pigment Yellow 74 prepared according to Example 2a and 15 parts of ester B are mixed in a high energy 2 blade mixer to give a thick paste. This material can be let down into a white spirit based long oil alkyd or a xylene based short oil alkyd to give a product of excellent gloss and flow.

What we claim is:

1. A composition comprising
   i. a pigment
   ii. a carboxy ester having an acid value in the range of from 15 to 140 mg KOH/g and having been formed by the reaction of:
      a. a compound of formula ROH, or a mixture of such compounds, wherein R is an alkyl or alkenyl residue, each having from 12 to 30 carbon atoms, or a hydroxy-terminated carboxylic acid ester having from 12 to 100 carbon atoms, with
      b. trimellitic acid or a derivative thereof and optionally
      c. a diol of the formula HO-Y-OH wherein Y is a straight- or branched-alkylene residue having from 2 to 12 carbon atoms, optionally containing in addition, an alkyl or alkylene side chain of 2 to 22 carbon atoms, attached by an ether or ester linkage, or Y is a hydrocarbon residue having from 4 to 12 carbon atoms containing ether or thioether linkages, and optionally
   iii. an organic liquid, wherein said carboxy ester is present in an amount of from 2 to 200% by weight based on the weight of pigment and the solvent is present in the range of from 10% to 90% by weight based on the total weight of the dispersion.

2. A composition as claimed in claim 1 wherein the carboxy ester component ii) is such that the mole ratio of its components a), b) and c) is $[a].[:[b]_{1-2}:[c]_{0-1}$, with the proviso that $[b] - [c] = 1$.

3. A composition according to claim wherein the organic liquid is an optionally halogenated hydrocarbon liquid.

4. A composition according to claim 1 wherein the organic liquid is one which forms the base of a paint or ink system.

5. A composition as claimed in claim 4 wherein the organic liquid is a long- or short oil alkyd resin or a natural oil.

6. A composition according to claim 1 wherein there is used to prepare the carboxy ester an organic solvent which will be used in subsequent pigment dispersion and formulation into a surface coating.

7. A composition according to claim 1 wherein the amount of carboxy ester is within the range of from 5 to 60% by weight, based on the total weight of the pigment.

8. A composition according to claim 1 wherein the amount of solvent is within the range of from 20 to 60% by weight, based on the total weight of the dispersion.

9. A surface coating containing a composition as claimed in claim 1.

10. A surface coating as claimed in claim 9 wherein the surface coating is a paint, lacquer or ink.

11. A surface coating as claimed in claim 10 wherein the ink is a gravure ink.

* * * * *

UNITED STATES PATENT AND TRADEMARK OFFICE
CERTIFICATE OF CORRECTION

PATENT NO. : 4,028,128
DATED : June 7, 1977
INVENTOR(S) : George Heddle Robertson It is certified that error appears in the above-identified patent and that said Letters Patent are hereby corrected as shown below:

Column 12, line 21, "$[a]:[:[b]_{1-2}:[c]_{0-1},$"

should read -- $[a]_2:[:[b]_{1-2}:[c]_{0-1},$ --.

Column 12, line 23, "claim wherein" should read -- claim 1 wherein --.

Signed and Sealed this thirtieth Day of August 1977

[SEAL]

Attest:

RUTH C. MASON
*Attesting Officer*

C. MARSHALL DANN
*Commissioner of Patents and Trademarks*